(12) United States Patent
Blom

(10) Patent No.: US 12,311,697 B2
(45) Date of Patent: May 27, 2025

(54) ARRANGEMENT FOR LIMITING ROTATION, AND ROBOT

(71) Applicant: ABB Schweiz AG, Baden (CH)

(72) Inventor: Jonatan Blom, Enskede (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/730,178

(22) PCT Filed: Jan. 25, 2022

(86) PCT No.: PCT/EP2022/051633
§ 371 (c)(1),
(2) Date: Jul. 18, 2024

(87) PCT Pub. No.: WO2023/143699
PCT Pub. Date: Aug. 3, 2023

(65) Prior Publication Data
US 2025/0026149 A1    Jan. 23, 2025

(51) Int. Cl.
*B60B 33/02* (2006.01)
*B60B 33/00* (2006.01)
*B60K 7/00* (2006.01)

(52) U.S. Cl.
CPC .......... *B60B 33/025* (2013.01); *B60B 33/006* (2013.01); *B60B 33/0068* (2013.01);
(Continued)

(58) Field of Classification Search
CPC . B60B 33/025; B60B 33/006; B60B 33/0068; B60B 33/0073; B60B 2900/1212; B60K 7/0007
(Continued)

(56) References Cited

U.S. PATENT DOCUMENTS 3,260,343 A    7/1966  Mccormick
3,751,758 A *  8/1973  Higbee ................... B60B 33/02
                                                            16/35 R
(Continued)

FOREIGN PATENT DOCUMENTS

CH        711932 A2    6/2017
JP     2002137188 A    5/2002
(Continued)

OTHER PUBLICATIONS

International Search Report and Written Opinion of the International Searching Authority; Application No. PCT/EP2022/051633; Completed: Sep. 14, 2022; Mailing Date: Oct. 5, 2022; 11 Pages.
(Continued)

*Primary Examiner* — Hau V Phan
(74) *Attorney, Agent, or Firm* — Whitmyer IP Group LLC

(57) ABSTRACT

An arrangement for limiting rotation, the arrangement including a base structure; a drive member rotatable relative to the base structure and having a drive feature; a stopping member having at least one driven feature, wherein the stopping member is arranged to be intermittently driven relative to the base structure between a plurality of discrete positions by a continuous rotation of the drive member and by cooperation between the drive feature and at least one driven feature, wherein the stopping member in a first end discrete position is arranged to limit rotation of the drive member in a first end position of a rotation range of the drive member; and a holding mechanism arranged to hold the stopping member in each discrete position, the holding mechanism being at least partly provided in the base structure.

20 Claims, 15 Drawing Sheets

(52) U.S. Cl.
CPC ........ *B60K 7/0007* (2013.01); *B60B 33/0073* (2013.01); *B60B 2900/115* (2013.01); *B60B 2900/1212* (2013.01); *B60B 2900/212* (2013.01); *B60B 2900/325* (2013.01)

(58) Field of Classification Search
USPC .......................................................... 180/55
See application file for complete search history.

(56) References Cited

U.S. PATENT DOCUMENTS

| | | | | |
|---|---|---|---|---|
| 4,394,937 | A * | 7/1983 | Flider | B65D 25/385 |
| | | | | 222/189.01 |
| 4,722,114 | A * | 2/1988 | Neumann | B60B 33/021 |
| | | | | 16/35 R |
| 4,815,161 | A * | 3/1989 | Timmer | B60B 33/021 |
| | | | | 16/35 R |
| 5,595,503 | A | 1/1997 | Pittman et al. | |
| 6,491,127 | B1 * | 12/2002 | Holmberg | B62D 7/026 |
| | | | | 301/6.5 |
| 6,668,965 | B2 * | 12/2003 | Strong | B62D 31/003 |
| | | | | 16/35 R |
| 7,506,404 | B2 * | 3/2009 | Block | B60B 33/026 |
| | | | | 16/35 R |
| 8,387,209 | B2 * | 3/2013 | Aubin | B60B 33/0073 |
| | | | | 16/48 |
| 8,393,431 | B2 * | 3/2013 | Swasey | B62D 7/026 |
| | | | | 180/411 |
| 9,757,980 | B1 * | 9/2017 | Jones | B60B 33/04 |
| 10,377,403 | B2 * | 8/2019 | Lee | B60K 17/043 |
| 10,384,531 | B2 * | 8/2019 | Yang | B60B 33/0018 |
| 11,130,519 | B1 | 9/2021 | Cui et al. | |
| 2007/0080000 | A1 | 4/2007 | Tobey et al. | |
| 2010/0107360 | A1 * | 5/2010 | Shih | B60B 1/006 |
| | | | | 16/21 |
| 2010/0107361 | A1 * | 5/2010 | Yang | B60B 33/0028 |
| | | | | 16/47 |
| 2011/0076873 | A1 | 3/2011 | Fonzo | |
| 2019/0160868 | A1 * | 5/2019 | Wiley | B60B 33/0039 |

FOREIGN PATENT DOCUMENTS

| | | |
|---|---|---|
| JP | 2009113667 A | 5/2009 |
| RU | 2023919 C1 | 11/1994 |
| RU | 94032956 A | 7/1996 |
| SU | 1364802 A1 | 1/1988 |

OTHER PUBLICATIONS

International Preliminary Report on Patentability; Application No. PCT/EP2022/051633; Issued: Jul. 30, 2024; 5 Pages.

Chinese Office Action; Application No. 2022800884876; Completed: Dec. 2, 2024; Issued: Dec. 3, 2024; 9 Pages.

\* cited by examiner

ARRANGEMENT FOR LIMITING ROTATION, AND ROBOT

TECHNICAL FIELD

The present disclosure generally relates to an arrangement for limiting rotation. In particular, an arrangement for limiting rotation comprising a holding mechanism at least partly provided in a base structure, and a robot comprising such arrangement, are provided.

BACKGROUND

In some mechanical constructions, such as a joint, it may be desirable to limit a rotation range of relative rotation between a first member and a second member. One reason for limiting the relative rotation is to protect cables passing through the joint. FIG. 18 shows a joint 10 comprising a first member 12 and a second member 14 rotatable relative to the first member 12. By providing a first tab 16 on the first member 12 and a second tab 18 on the second member 14 for engaging the first tab 16 from two directions, the rotation range can be limited to slightly below 360 degrees.

The concept to limit relative rotation shown in FIG. 18 can be expanded to provide a joint 20 as shown in FIG. 19. The joint 20 additionally comprises an intermediate member 22 between the first member 12 and the second member 14. The intermediate member 22 comprises a first intermediate tab 24 for engaging the first tab 16 and a second intermediate tab 26 for engaging the second tab 18. With the joint 20, the rotation range can be limited to slightly below 720 degrees. Further intermediate members 22 may be added to the joint 20 to increase the relative rotation range. However, each intermediate member 22 adds size and friction to the joint 20.

FIG. 20 shows a Geneva stopwork 28 that can be used to limit rotation between two members. The Geneva stopwork 28 comprises a drive wheel 30 and a driven wheel 32. The drive wheel 30 comprises a pin 34 and a blocking disc 36. The driven wheel 32 of this example comprises three arms 38a-38c. Each of the first and second arms 38a, 38b comprises a slot for receiving the pin 34. The third arm 38c does not comprise a slot and is therefore closed. A concave recess 40 in the blocking disc 36 allows passing of the first and second arms 38a and 38b. A continuous rotation of the drive wheel 30 is transmitted to an intermittent rotation of the driven wheel 32. The third arm 38c blocks the pin 34 in each of two end positions of the drive wheel 30. The rotation range of the drive wheel 30 is here approximately 1016 degrees. When the pin 34 has left a slot, the driven wheel 32 is prevented from rotation by one of three curved portions 42a-42c between the arms 38a-38c lying closely against a circular stopping surface 44 of the blocking disc 36.

Although the Geneva stopwork 28 in FIG. 20 can be designed relatively flat and can enable a rotation range of more than 360 degrees, it has several drawbacks. Due to the cooperation between the curved portions 42a-42c and the stopping surface 44, the Geneva stopwork 28 has to be produced and assembled with narrow tolerances. Moreover, even if these tolerances are narrow, contact will occur between the curved portions 42a-42c and the stopping surface 44. The Geneva stopwork 28 therefore has a general issue of friction between the curved portions 42a-42c and the stopping surface 44. In implementations where it is desired to provide a large central space on the drive wheel 30 and consequently a large blocking disc 36, the frictional forces between the curved portions 42a-42c and the stopping surface 44 will act far away from a rotation axis of the drive wheel 30 and thereby generate high torques about the rotation axis, potentially even stopping rotation of the drive wheel 30.

SUMMARY

One object of the invention is to provide an improved arrangement for limiting rotation. This object is achieved by the arrangement according to the claims.

The invention is based on the realization that by providing a holding mechanism arranged to hold a stopping member in each of a plurality of discrete positions, and where the holding mechanism is decoupled from a drive member, a large area can be provided in a drive member, tolerances can be relaxed, and friction can be reduced.

According to a first aspect, there is provided an arrangement for limiting rotation, the arrangement comprising a base structure; a drive member rotatable relative to the base structure about a drive axis, the drive member having a drive feature offset from the drive axis; a stopping member having at least one driven feature, wherein the stopping member is arranged to be intermittently driven relative to the base structure between a plurality of discrete positions by a continuous rotation of the drive member and by cooperation between the drive feature and at least one driven feature, wherein the stopping member in a first end discrete position is arranged to limit rotation of the drive member in a first end position of a rotation range of the drive member, and in a second end discrete position is arranged to limit rotation of the drive member in a second end position of the rotation range; and a holding mechanism arranged to hold the stopping member in each discrete position, the holding mechanism being at least partly provided in the base structure.

Due to the holding mechanism being at least partly provided in the base structure, the stopping member can be held in each discrete position (one at a time) without interaction with the drive member. The stopping member therefore functions more independently of the drive member, for example in comparison with a Geneva stopwork where a driven wheel is held in position by a stopping surface on a blocking disc on a drive wheel. This independence is of great advantage for several reasons. Both manufacturing tolerances and assembly tolerances of the drive member and the stopping member can be made larger, i.e. less accurate. The stopping member can for example be a 3D-printed plastic component. Moreover, frictional losses in the arrangement are greatly reduced even for a large drive member.

When the drive feature cooperates with the driven feature to intermittently drive the stopping member, the drive force from the drive member overcomes the holding force by the holding mechanism and causes the stopping member to move. Except for the holding mechanism, the arrangement may function as a Geneva stopwork. The rotation range may be at least 360 degrees about the drive axis, such as at least 540 degrees about the drive axis.

The drive feature may contact each driven feature to cooperate with the same. As a possible alternative, the drive feature may magnetically cooperate with each driven feature.

The stopping member may further comprise at least one stopping feature. In this case, a drive feature of the drive member may cooperate with one of the at least one stopping feature in each of the first end position when the stopping member is in the first end discrete position, and the second end position when the stopping member is in the second end discrete position. This drive feature may or may not be the same drive feature that cooperates with the at least one driven feature.

The holding mechanism may comprise at least one magnet arranged to hold the stopping member in each discrete position by magnetic force. The use of at least one magnet enables a very reliable operation and a simpler design. For example, the at least one magnet may be molded inside the stopping member.

According to one example, the at least one magnet comprises one stopping magnet fixed to the stopping member and a plurality of base magnets fixed to the base structure, where the number of base magnets corresponds to the number of discrete positions. According to a further example, the at least one magnet comprises one base magnet fixed to the base structure and a plurality of stopping magnets fixed to the stopping member, where the number of stopping magnets corresponds to the number of discrete positions. The one or more stopping magnets may be configured to magnetically attract each base magnet. Either the one or more stopping magnets or the one or more base magnets may be replaced with one or more ferromagnetic metal parts.

As one possible alternative, the holding mechanism may comprise a spring biased pin (e.g. on the stopping member) that can be seated in one of several recesses (e.g. in the base structure) where each recess corresponds to a unique discrete position.

The stopping member may be rotatable about a stopping axis. In this case, the base structure may be positioned next to the stopping member along the stopping axis. The stopping axis may be substantially parallel with, or parallel with, the drive axis. The arrangement is however also possible to implement with a linearly translating stopping member.

The arrangement may further comprise a plain bearing and the stopping member may be rotatably supported about the stopping axis by the plain bearing. This makes the arrangement more cost-efficient. The use of a plain bearing is in turn enabled by the relaxed tolerances of the arrangement.

In case the stopping member comprises a stopping feature, the stopping feature and the stopping axis may be substantially positioned on a line, or positioned on a line, deviating at most 30°, such as at most 20° or at most 10°, from a tangential line at the drive feature with respect to the drive axis when the stopping member is in the first end discrete position and the drive member is in the first end position. In this way, a torque acting on the stopping member in the first end discrete position can be kept close to zero or zero. As a consequence, a mechanical strength of the stopping member can be low. The arrangement can thereby be made cost-efficient, e.g. by using plastic or other cheap, light and easily formable material. The stopping feature may cooperate with (e.g. by contacting) a drive feature of the drive member to limit rotation of the drive member in the first end position. This drive feature may or may not be the same drive feature that cooperates with the at least one driven feature. Alternatively, or in addition, the stopping feature and the stopping axis may be substantially positioned on a line, or positioned on a line, deviating at most 30°, such as at most 20° or at most 10°, from a tangential line at the drive feature with respect to the drive axis when the stopping member is in the second end discrete position and the drive member is in the second end position.

The drive feature may be positioned on a drive member surface of the drive member. In this case, a distance from the drive axis to the drive feature may be at least 80% of a distance from the drive axis to a radially outermost position of the drive member surface with respect to the drive axis.

The drive feature may comprise a drive pin. In this case, each driven feature (and optionally each stopping feature) may be a recess. The drive pin may protrude in parallel with the drive axis.

The stopping member may be made of plastic. The stopping member may be made by molding or by 3D-printing.

The arrangement may further comprise a cable fixed with respect to each of the base structure and the drive member. The arrangement may further comprise a driven motor fixed with respect to the drive member. In this case, the cable may be fixedly connected to the driven motor. Such fixed connection differs from a connection by means of a slip ring, which is subject to wear. For example, a first end of the cable may be fixed to the base structure and a second end of the cable may be fixed to the driven motor. The cable may be twisted (to an extend defined by the arrangement) between the base structure and the driven motor.

The arrangement may further comprise a drive motor arranged to drive the drive member about the drive axis. In this case, the drive motor may be positioned radially inside the drive feature with respect to the drive axis.

According to a further aspect, there is provided a robot comprising an arrangement according to the first aspect. The robot may be an automated guided vehicle, AGV, comprising at least one wheel unit including a traction wheel rotatable about the drive axis and about a wheel axis perpendicular to the drive axis.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
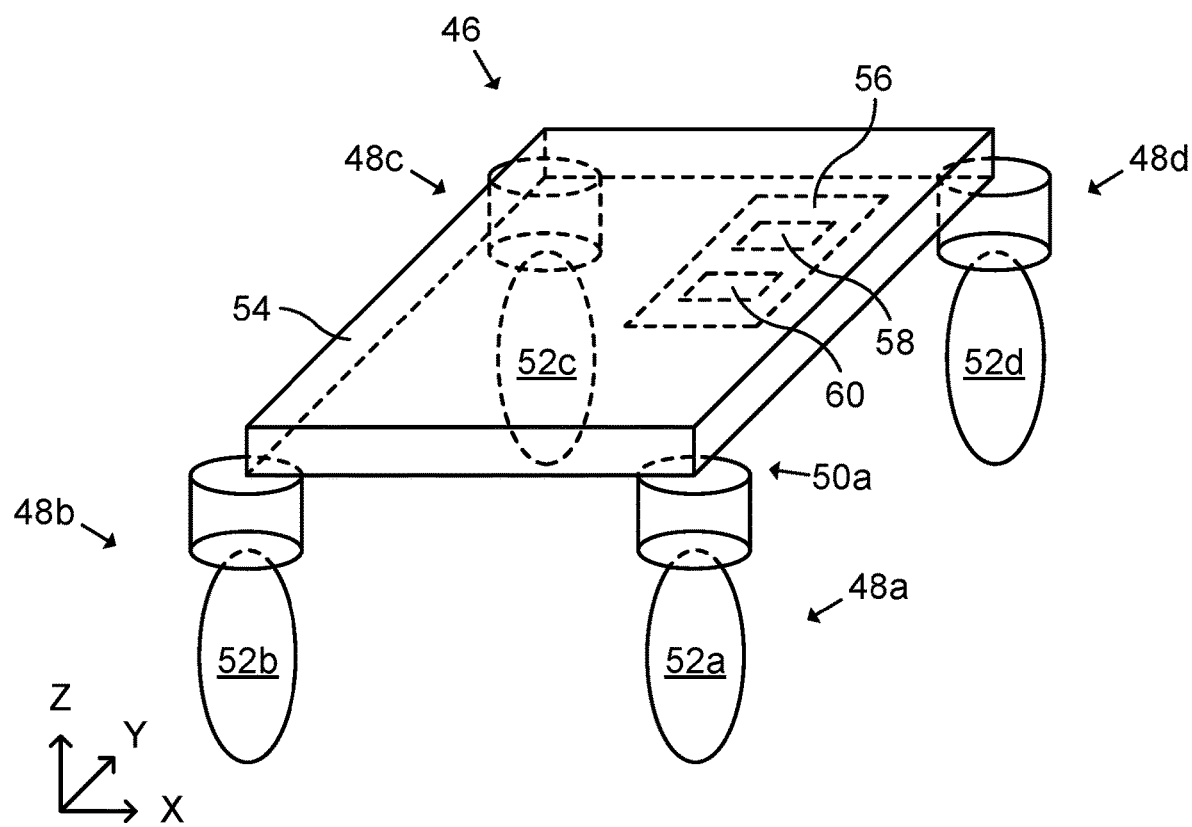
FIG. 1: schematically represents a perspective view of a robot comprising a plurality of wheel units each having an arrangement for limiting rotation.

In the following, an arrangement for limiting rotation, and a robot comprising such arrangement, will be described. The same or similar reference numerals will be used to denote the same or similar structural features.

FIG. 1 schematically represents a perspective view of a robot, here exemplified as an automated guided vehicle, AGV, 46. The AGV 46 comprises a plurality of wheel units 48a-48d, here four-wheel units 48a-48d. Each wheel unit 48a-48d comprises an arrangement for limiting rotation. In FIG. 1, only one such arrangement 50a for the first wheel unit 48a is denoted.

The first wheel unit 48a comprises a first traction wheel 52a, the second wheel unit 48b comprises a second traction wheel 52b, the third wheel unit 48c comprises a third traction wheel 52c, and the fourth wheel unit 48d comprises a fourth traction wheel 52d. Although the AGV 46 in FIG. 1 comprises four-wheel units 48a-48d, the AGV 46 may alternatively comprise less than four wheel units or more than four wheel units. The traction wheels 52a-52d are configured to drive the AGV 46 on a surface, such as a horizontal floor. FIG. 1 further shows a Cartesian coordinate system X, Y, Z for referencing purposes. The horizontal surface may lie in the XY-plane.

The AGV 46 further comprises a platform 54. The platform 54 is one example of a base structure according to the present disclosure. The platform 54 is rigid. The platform 54 provides a support surface on its upper side for carrying a load, such as a robotic manipulator.

The AGV 46 further comprises a control system 56. The control system 56 comprises a data processing device 58 and a memory 60 having a computer program stored thereon. The control system 56 is configured to control movements of the traction wheels 52a-52d. In this example, the control system 56 is provided in the platform 54. The control system 56 is in signal communication with each wheel unit 48a-48d. The control system 56 may also comprise a battery (not shown) for powering each wheel unit 48a-48d.

Figure 2:
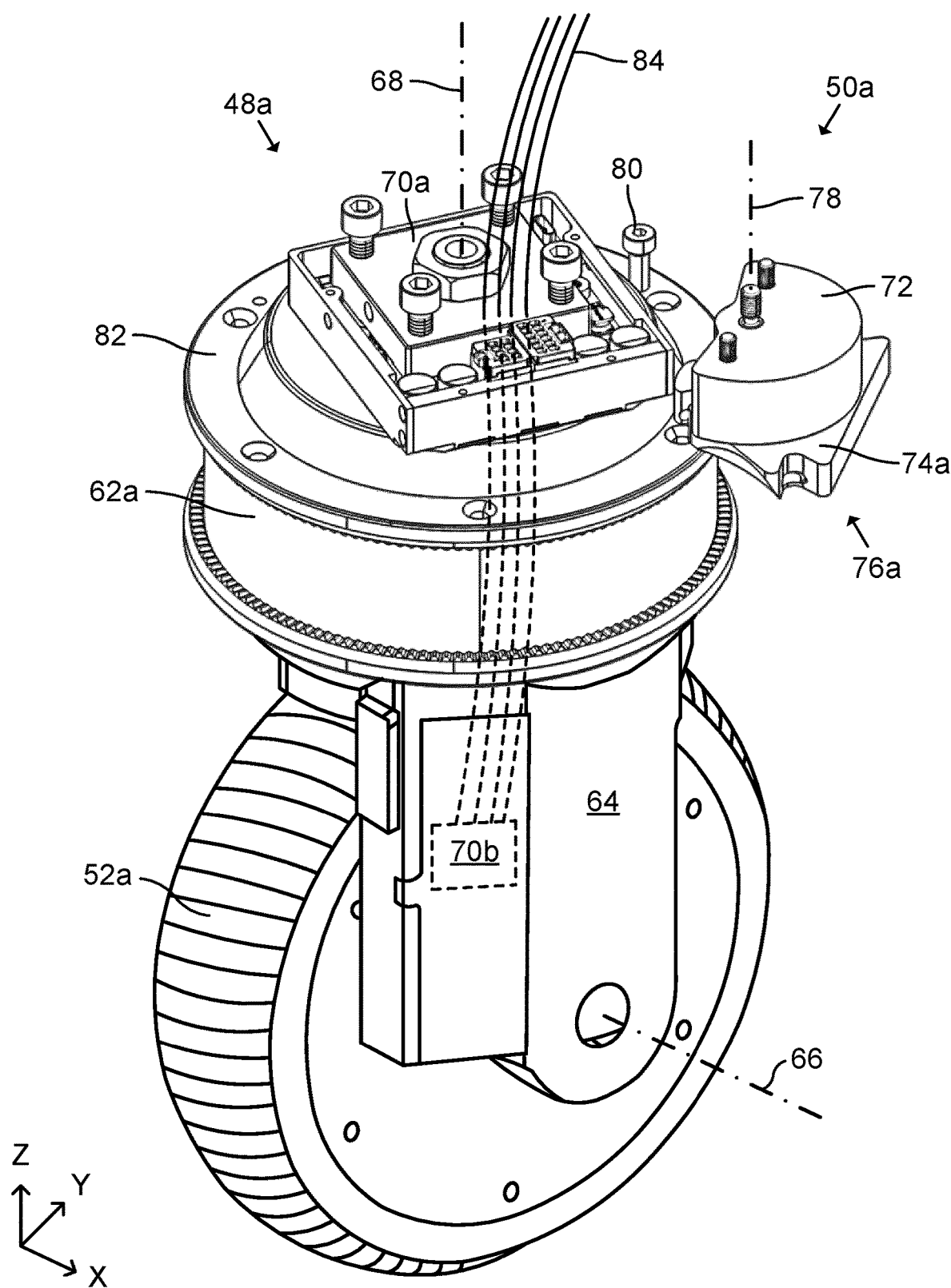
FIG. 2: schematically represents a perspective view of one of the wheel units.

FIG. 2 schematically represents a perspective view of the first wheel unit 48a. In this example, all wheel units 48a-48d are of the same design. In addition to the first traction wheel 52a, the first wheel unit 48a comprises a drive member 62a. The first wheel unit 48a of this example further comprises a steering member 64 fixed to the drive member 62a. The first traction wheel 52a is rotatable relative to the steering member 64 about a wheel axis 66. The drive member 62a is rotatable about a drive axis 68, here exemplified as a steering axis. The wheel axis 66 is perpendicular to the drive axis 68. Moreover, the wheel axis 66 intersects the drive axis 68. In FIG. 2, the wheel axis 66 is horizontal and the drive axis 68 is vertical.

The first wheel unit 48a further comprises an electric drive motor 70a. The drive motor 70a is arranged to rotationally drive the drive member 62a, and consequently also the first traction wheel 52a, about the drive axis 68. The drive motor 70a of this example is fixed to the platform 54.

The first wheel unit 48a further comprises an electric driven motor 70b. The driven motor 70b is arranged to rotationally drive the first traction wheel 52a about the wheel axis 66. The driven motor 70b of this example is fixed to the steering member 64.

The wheel axis 66 and the drive axis 68 provide two degrees of freedom for the first wheel unit 48a. As a result, the AGV 46 is configured to perform omni directional movements, i.e. it can move in any direction along a floor and can rotate in a controlled manner and independently from its translation along its path.

The arrangement 50a of this example further comprises a block 72. The block 72 is a further example of a base structure according to the present disclosure. The block 72 is fixed to the platform 54.

The arrangement 50a further comprises a stopping member 74a. In FIG. 2, the stopping member 74a is in an intermediate discrete position 76a.

The stopping member 74a is rotatable relative to the block 72 about a stopping axis 78. The stopping axis 78 is here parallel with the drive axis 68. The block 72 is positioned next to the stopping member 74a along the stopping axis 78.

The drive member 62a comprises a drive pin 80. The drive pin 80 is one example of a drive feature according to the present disclosure. The drive pin 80 is eccentric with respect to the drive axis 68. The drive pin 80 of this example protrudes from a drive member surface 82 on the drive member 62a in parallel with the drive axis 68 (upwards in FIG. 2). The drive member surface 82 is here transverse to the drive axis 68. As shown in FIG. 2, the drive motor 70a is positioned radially inside the drive pin 80 with respect to the drive axis 68.

As schematically illustrated in FIG. 2, cables 84 are routed from the control system 56, through the drive member 62a, and to the driven motor 70b in the steering member 64. First ends of the cables 84 are fixedly connected to the control system 56 and second ends of the cables 84 are fixedly connected to the driven motor 70b. In this way, slip rings can be avoided. The cables 84 may for example be signal cables and/or power cables. When the first traction wheel 52a rotates about the drive axis 68, the cables 84 are twisted. The arrangement 50a is configured to limit rotation of the drive member 62a about the drive axis 68 relative to the platform 54 to a predefined rotation range. The rotation range is set to limit the twisting of the cables 84 to a tolerable level.

The rotation range defined by the arrangement 50a may be determined based on the specific application, but should not exceed a critical range of twisting of the cables 84. A larger rotation range reduces the need for the AGV 46 of this example to stop and reorient the traction wheels 52a-52d.

In this implementation, the center of the drive member 62a is not accessible for cabling. As shown in FIG. 2, the cables 84 are routed through the drive member 62a offset from the drive axis 68.

Figure 3:
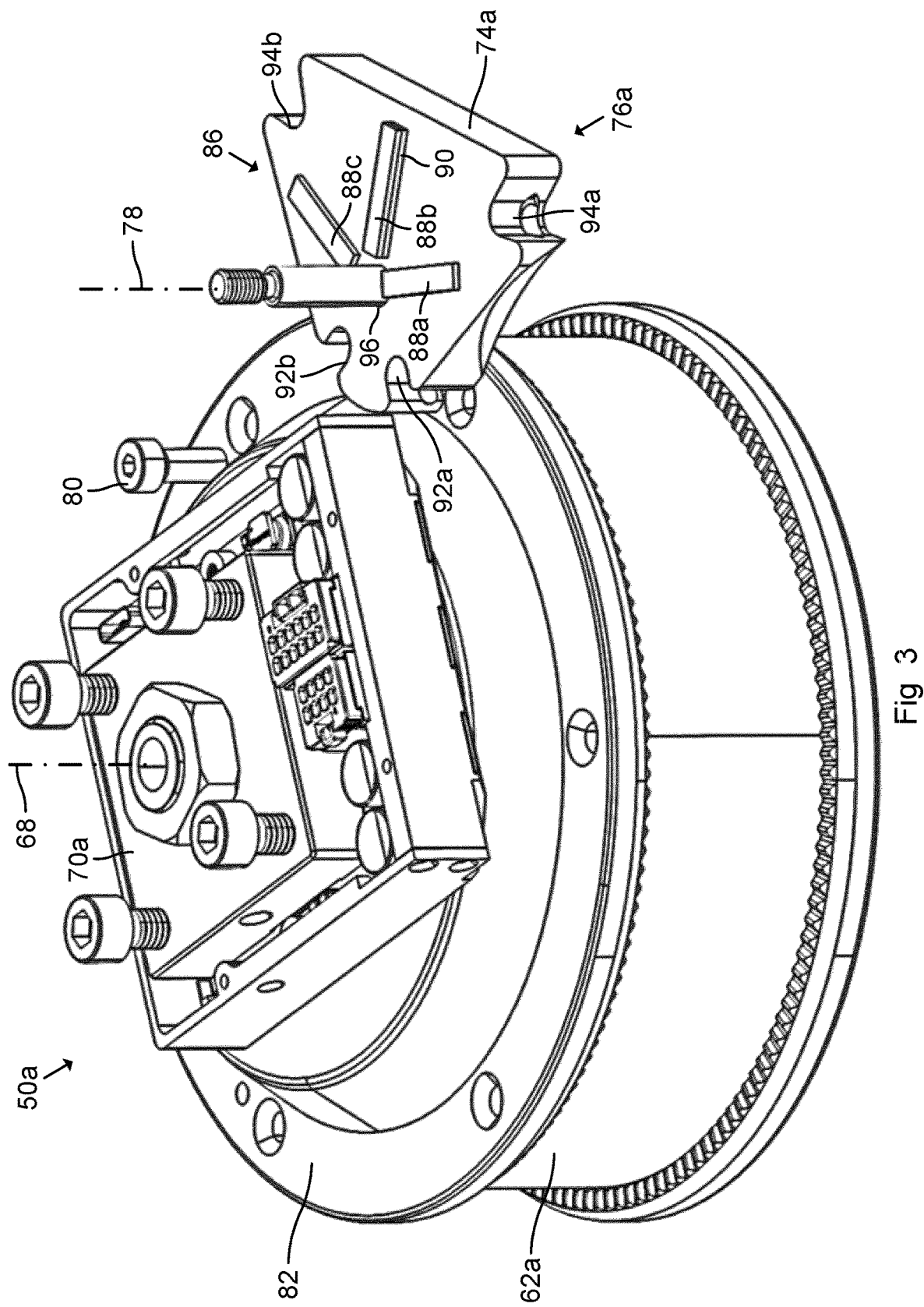
FIG. 3: schematically represents a perspective view of the arrangement.

FIG. 3 schematically represents a perspective view of the arrangement 50a. In FIG. 3, the block 72 is removed to improve visibility. The arrangement 50a comprises a holding mechanism 86. The holding mechanism 86 is configured to hold the stopping member 74a in each of a plurality of discrete positions, such as in the illustrated intermediate discrete position 76a.

The holding mechanism 86 of this specific example comprises three base magnets 88a-88c fixed to the block 72 and one stopping magnet 90 fixed to the stopping member 74a. The holding mechanism 86 is thereby partly arranged in the block 72 and decoupled from the drive member 62a. This enables a large area to be provided for the drive motor 70a radially inside of the drive pin 80. Moreover, since the stopping member 74a does not have to contact the drive member 62a to be held in its discrete positions, tolerances can be relaxed, and friction can be reduced.

Each of the block 72 and the stopping member 74a may be a 3D printed plastic component. Optionally, the base magnets 88a-88c and the stopping magnet 90 may be embedded inside the block 72 and the stopping member 74a, respectively. As can be gathered from FIGS. 2 and 3, the stopping magnet 90 and base magnets 88a-88c are not visible from the exterior of the first wheel unit 48a.

In the intermediate discrete position 76a, the stopping magnet 90 is aligned with and attracted to the second base magnet 88b. In this way, the holding mechanism 86 holds the stopping member 74a in the intermediate discrete position 76a by magnetic force.

The stopping member 74a of this example further comprises two driven features 92a and 92b. The stopping member 74a may however comprise only one driven feature or more than two driven features. The driven features 92a and 92b are here exemplified as recesses, each configured to receive the drive pin 80.

The stopping member 74a of this example further comprises two stopping features 94a and 94b. The stopping member 74a may alternatively comprise only one stopping feature. The stopping features 94a and 94b are here exemplified as recesses, each configured to receive the drive pin 80. A damping layer (not shown) may be provided in each of the stopping features 94a and 94b and the driven features 92a and 92b to more smoothly receive the drive pin 80.

The arrangement 50a of this example comprises a plain bearing 96. The stopping member 74a is rotatable about the stopping axis 78 by means of the plain bearing 96.

Figure 4:
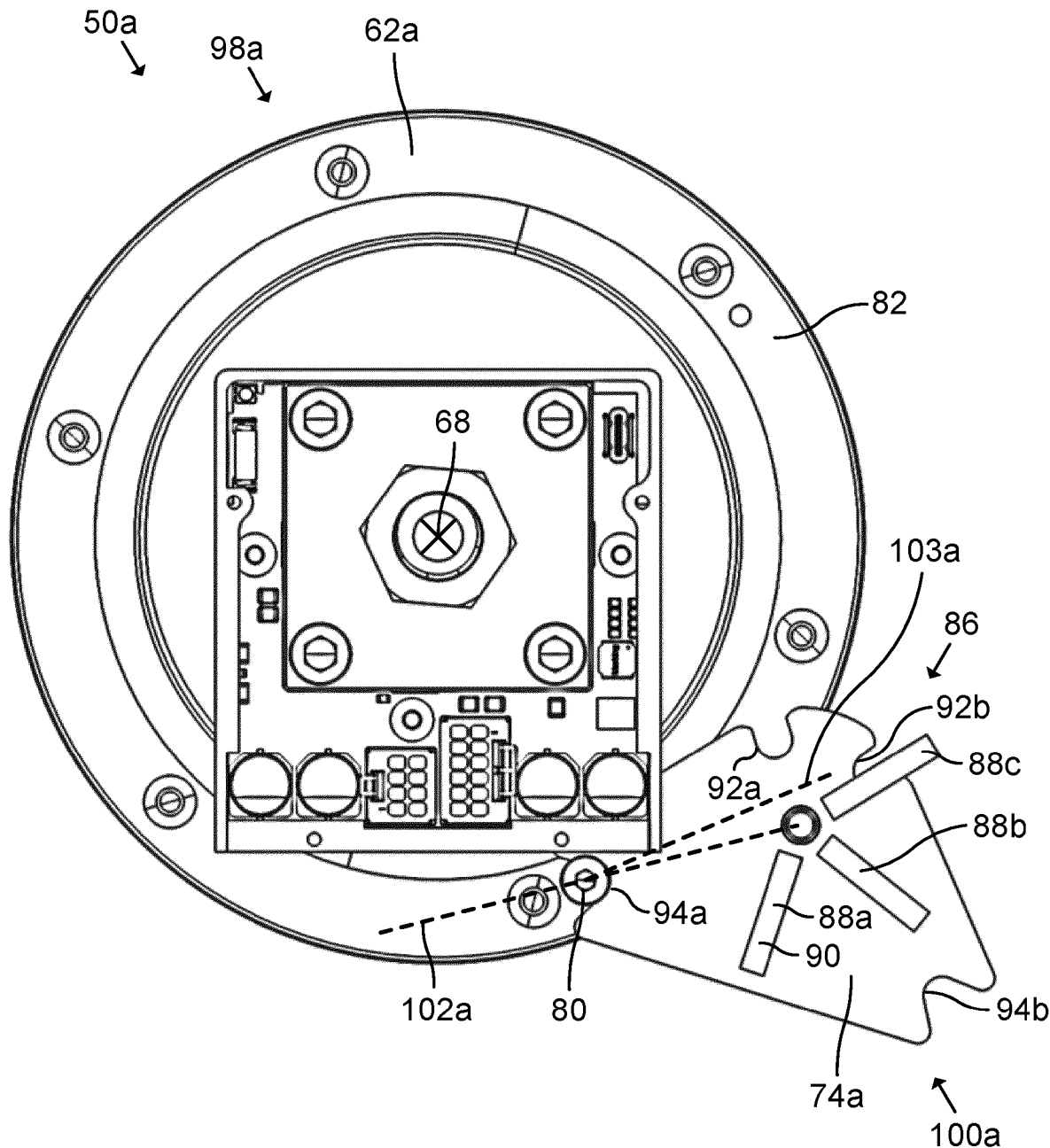
FIG. 4: schematically represents a top view of the arrangement when a drive member is in a first end position and a stopping member is in a first end discrete position.

FIG. 4 schematically represents a top view of the arrangement 50a. In FIG. 4, the drive member 62a is in a first end position 98a of the rotation range. The stopping member 74a is in a first end discrete position 100a. In the first end discrete position 100a, the stopping magnet 90 is aligned with and attracted to the first base magnet 88a. In this way, the holding mechanism 86 holds the stopping member 74a in the first end discrete position 100a by magnetic force. When the stopping member 74a is in the first end discrete position 100a and the drive member 62a is in the first end position 98a, the drive pin 80 is seated in the first stopping feature 94a, and the first stopping feature 94a, the stopping axis 78 and the drive pin 80 are positioned on a line 102a. The line 102a is angled less than 30° from a tangential line 103a at the drive pin 80 with respect to the drive axis 68. In FIG. 4, the line 102a is angled approximately 10° from the tangential line 103a. In this way, rotation of the drive member 62a (counterclockwise in FIG. 4) is stopped without generating any substantial torque on the stopping member 74a and without the stopping member 74a having to contact the drive member 62a (except the drive pin 80 thereof). FIG. 4 further shows that a radial distance from the drive axis 68 to the drive pin 80 is approximately 87% of a radial distance from the drive axis 68 to a radially outermost position of the drive member surface 82.

Figure 5:
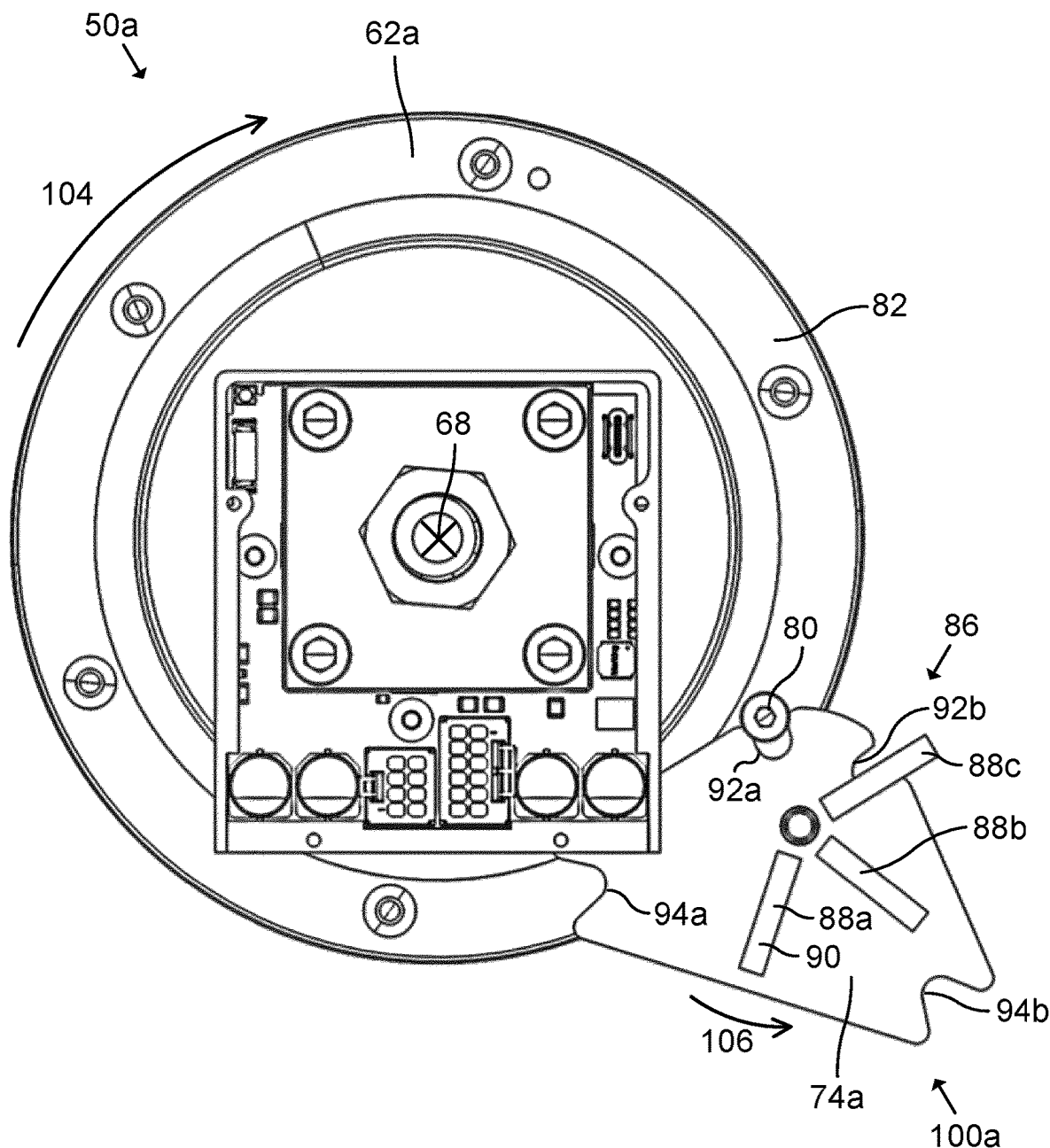
FIG. 5: schematically represents a top view of the arrangement when the drive member has rotated from the first end position.

FIG. 5 schematically represents a top view of the arrangement 50a when the drive member 62a has rotated from the first end position 98a (clockwise in FIG. 5) as illustrated with arrow 104. The drive pin 80 moves along a circular drive path concentric with the drive axis 68.

When the drive member 62a has rotated almost a full turn about the drive axis 68, the drive pin 80 engages the first driven feature 92a. The rotation of the drive member 62a and the engagement between the drive pin 80 and the first driven feature 92a overcomes the magnetic holding force between the stopping magnet 90 and the first base magnet 88a, and causes the stopping member 74a to rotate (counterclockwise in FIG. 5) as illustrated with arrow 106.

Figure 6:
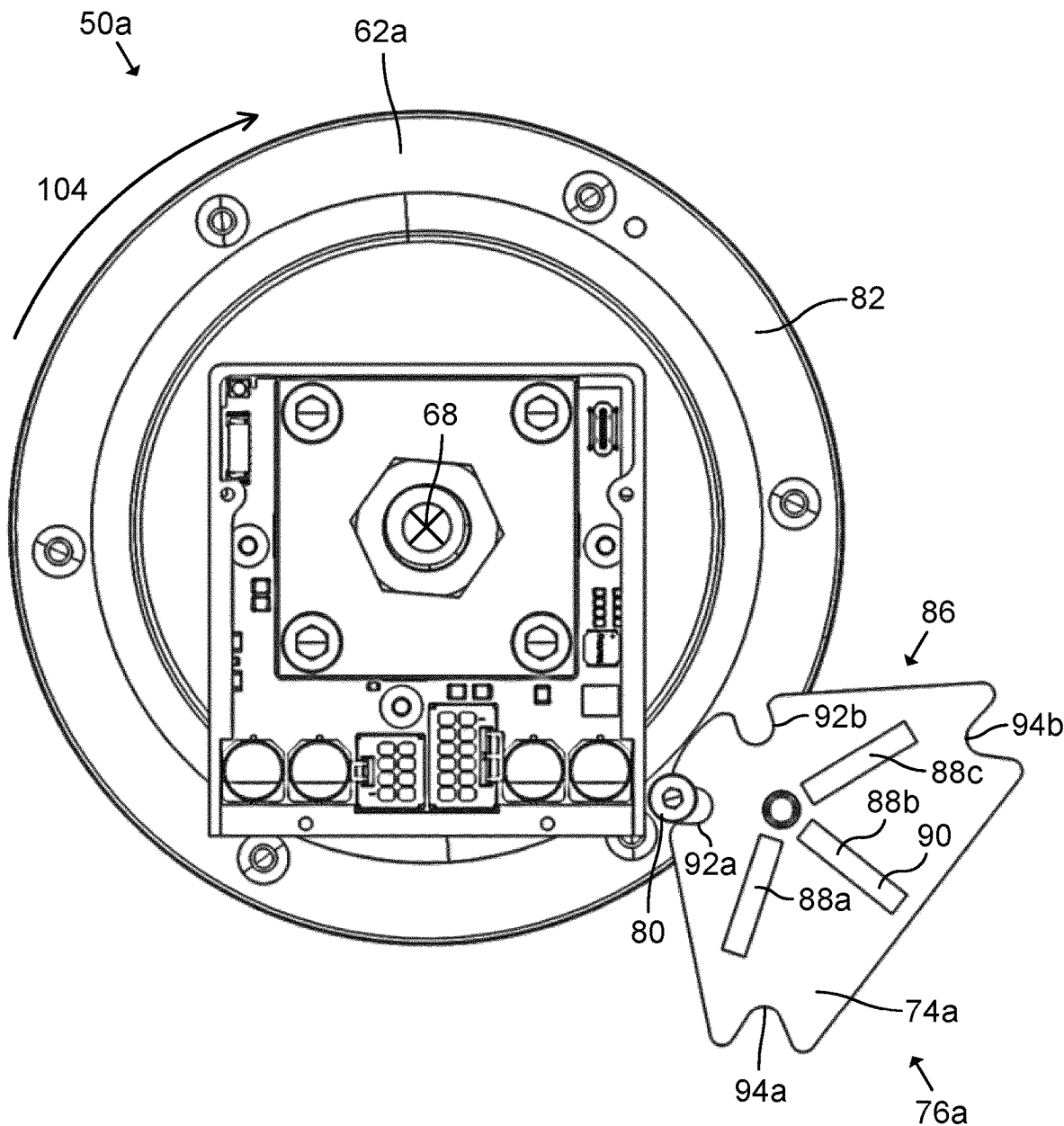
FIG. 6: schematically represents a top view of the arrangement when the drive member has rotated further and the stopping member has moved to an intermediate discrete position.

FIG. 6 schematically represents a top view of the arrangement 50a when the drive member 62a has rotated further. The stopping member 74a has now been rotated to the intermediate discrete position 76a where the stopping magnet 90 is aligned with and attracted to the second base magnet 88b. The arrangement 50a is thus configured to transmit a continuous rotation of the drive member 62a to an intermittent rotation of the stopping member 74a.

Figure 7:
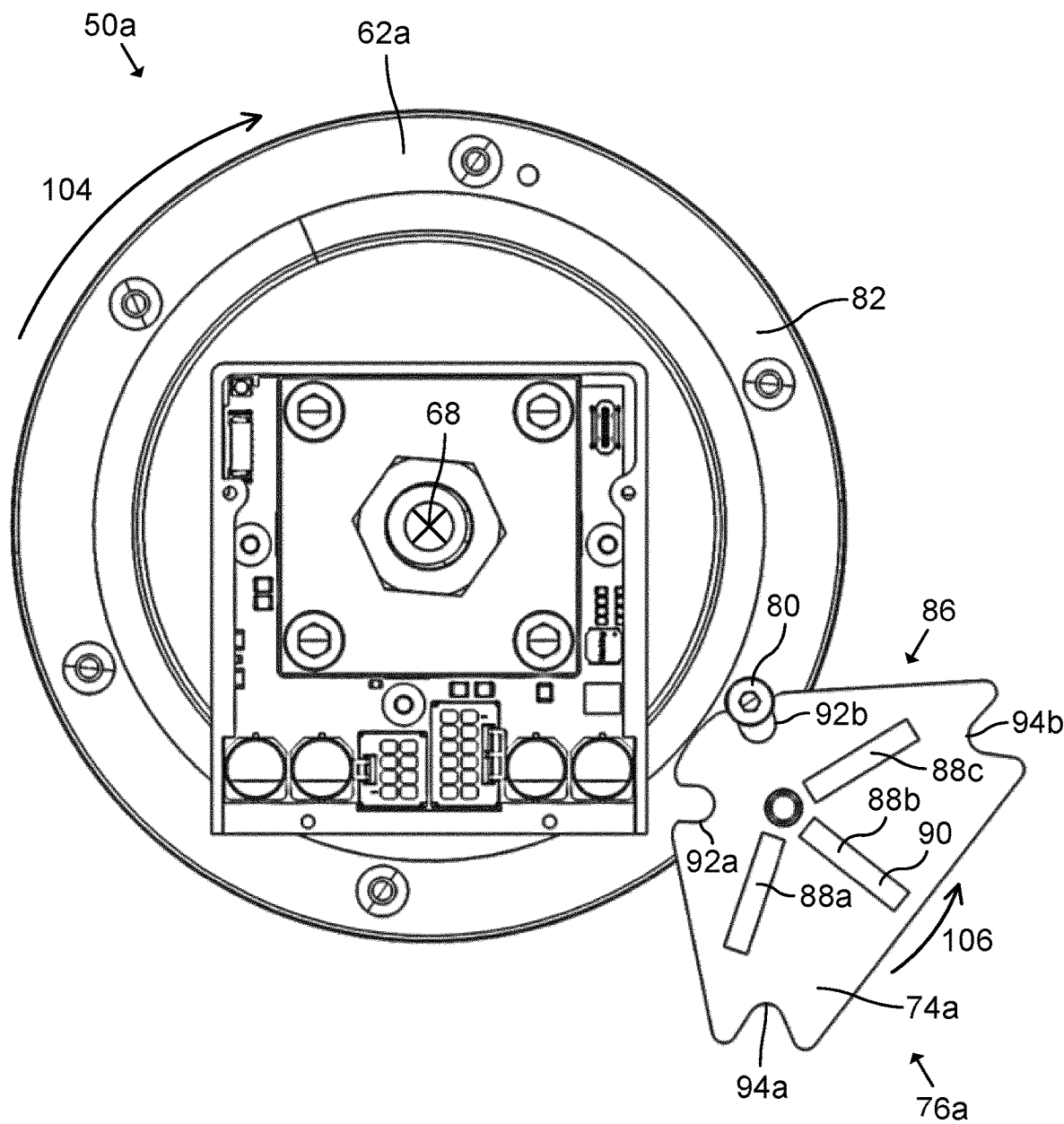
FIG. 7: schematically represents a top view of the arrangement when the drive member has rotated further.

FIG. 7 schematically represents a top view of the arrangement 50a when the drive member 62a has rotated further. In FIG. 7, the drive pin 80 now engages the second driven feature 92b. The rotation of the drive member 62a and the engagement between the drive pin 80 and the second driven feature 92b overcomes the magnetic holding force between the stopping magnet 90 and the second base magnet 88b, and causes the stopping member 74a to again rotate (counterclockwise in FIG. 7) as illustrated with arrow 106.

Figure 8:
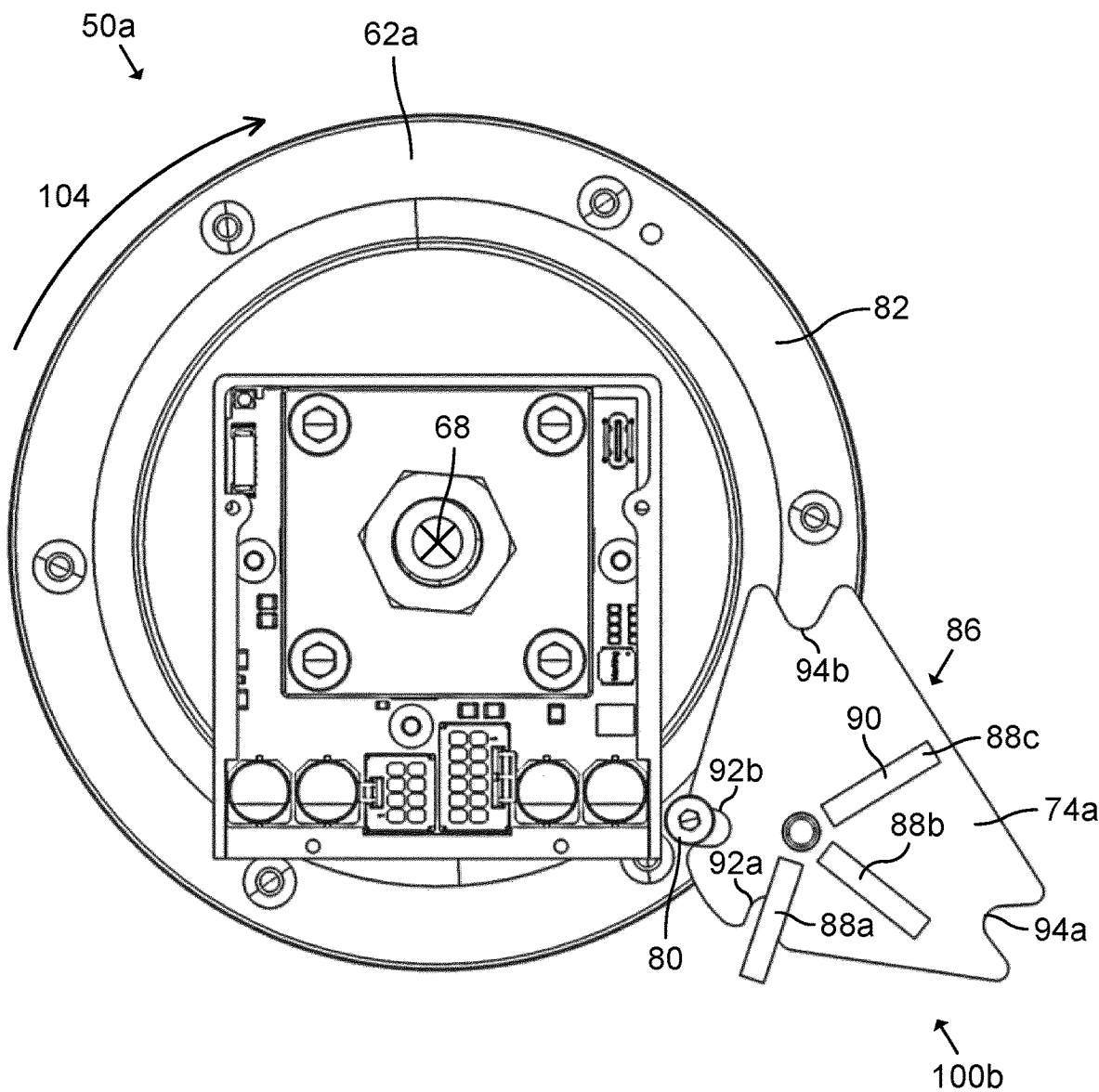
FIG. 8: schematically represents a top view of the arrangement when the drive member has rotated further and the stopping member has moved to a second end discrete position.

FIG. 8 schematically represents a top view of the arrangement 50a when the drive member 62a has rotated further. The stopping member 74a has now been rotated to a second end discrete position 100b. In the second end discrete position 100b, the stopping magnet 90 is aligned with and attracted to the third base magnet 88c.

Figure 9:
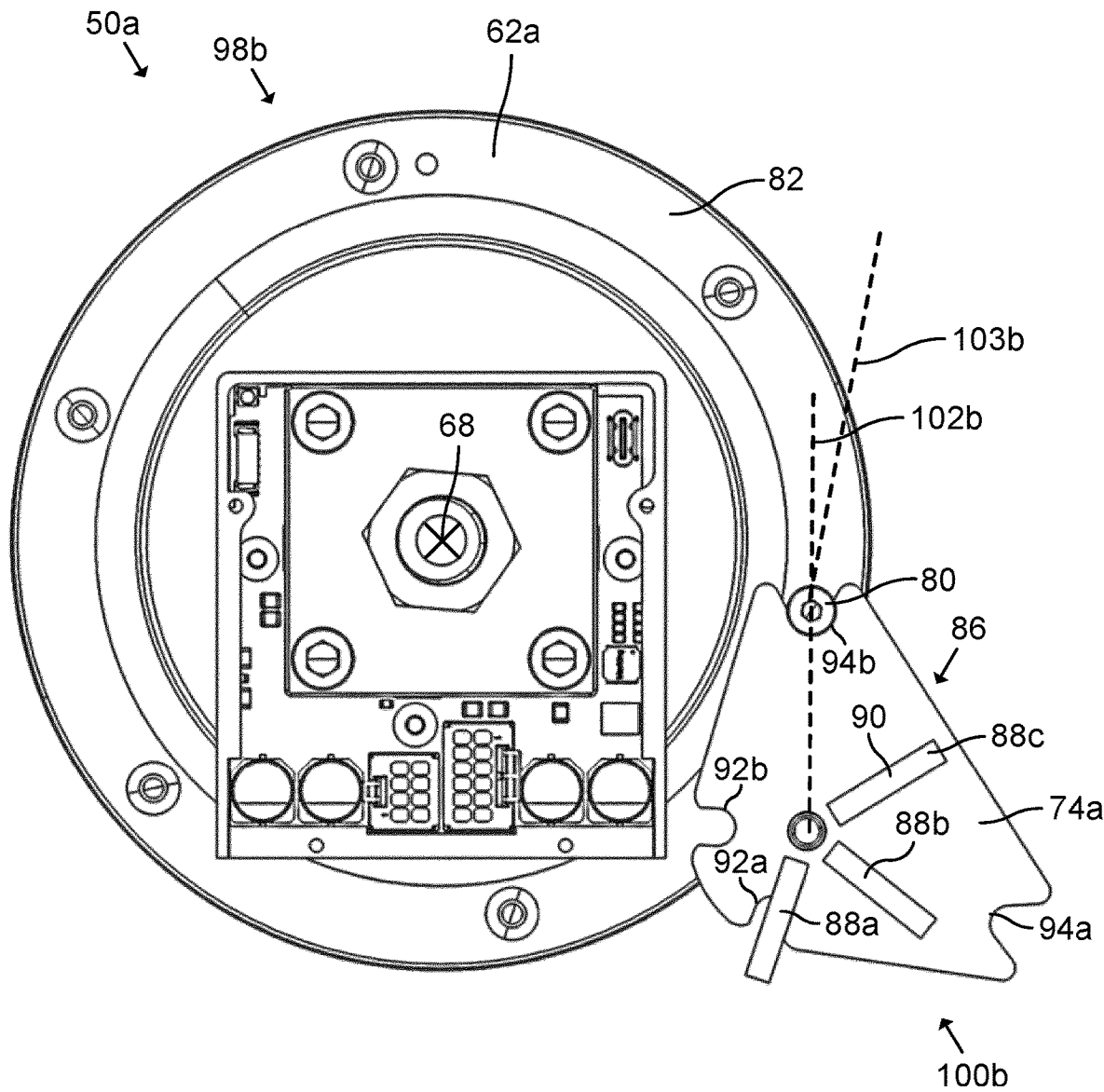
FIG. 9: schematically represents a top view of the arrangement when the drive member has rotated further to a second end position.

FIG. 9 schematically represents a top view of the arrangement 50a when the drive member 62a has rotated further to a second end position 98b of the rotation range. When the stopping member 74a is in the second end discrete position 100b and the drive member 62a is in the second end position 98b, the drive pin 80 is seated in the second stopping feature 94b, and the second stopping feature 94b, the stopping axis 78 and the drive pin 80 are positioned on a line 102b. The line 102b is angled less than 30° from a tangential line 103b at the drive pin 80 with respect to the drive axis 68. In FIG. 9, the line 102b is angled approximately 10° from the tangential line 103b. In this way, rotation of the drive member 62a (clockwise in FIG. 9) is stopped without generating any substantial torque on the stopping member 74a and without the stopping member 74a having to contact the drive member 62a (except the drive pin 80 thereof). The rotation range of the specific arrangement 50a is approximately 1024 degrees.

The arrangement 50a limits rotation of the drive member 62a regardless of whether the drive motor 70a is powered. Due to the arrangement 50a, bulky and error-prone slip rings for the cables 84 can be avoided.

Since the drive member 62a is relatively seldom in contact with the stopping member 74a (only when the drive pin 80 contacts the stopping member 74a), the manufacturing tolerances and the assembly tolerances can be relaxed. For example, the drive axis 68 does not have to be perfectly parallel with the stopping axis 78. This enables a more cost-efficient design.

Figure 10:
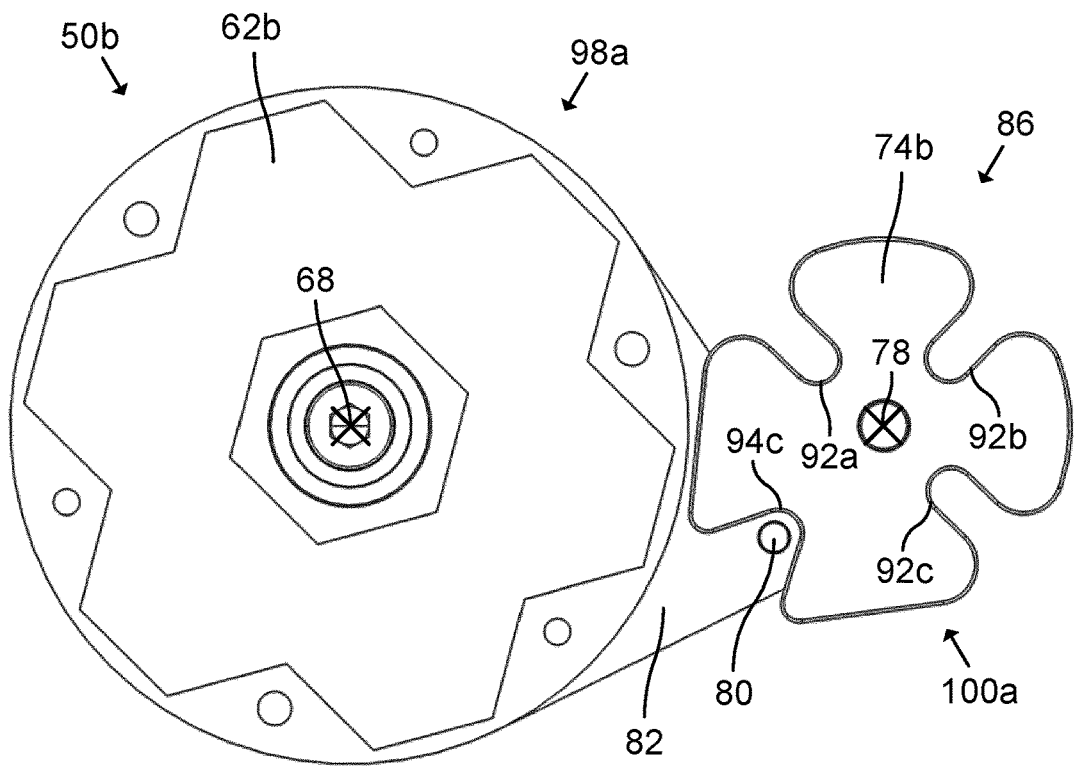
FIG. 10: schematically represents a top view of a further example of an arrangement for limiting rotation when a drive member is in a first end position and a stopping member is in a first end discrete position.

FIG. 10 schematically represents a top view of a further example of an arrangement 50b for limiting rotation. Mainly differences with respect to the arrangement 50a will be described. Details of the holding mechanism 86 are omitted in FIG. 10. The holding mechanism 86 of the arrangement 50b may be of the same or similar type as the holding mechanism 86 of the arrangement 50a.

The arrangement 50b comprises a drive member 62b and a stopping member 74b. As shown in FIG. 10, the shapes of the drive member 62b and the stopping member 74b differ from the drive member 62a and the stopping member 74a, respectively, but the principles of operation are the same.

The stopping member 74b comprises only one stopping feature 94c. Moreover, the stopping member 74b comprises three driven features 92a-92c. In FIG. 10, the drive member 62b is in a first end position 98a and the stopping member 74b is in a first end discrete position 100a. The stopping member 74b is held in the first end discrete position 100a by the holding mechanism 86. The drive pin 80 is seated in the stopping feature 94c.

Figure 11:
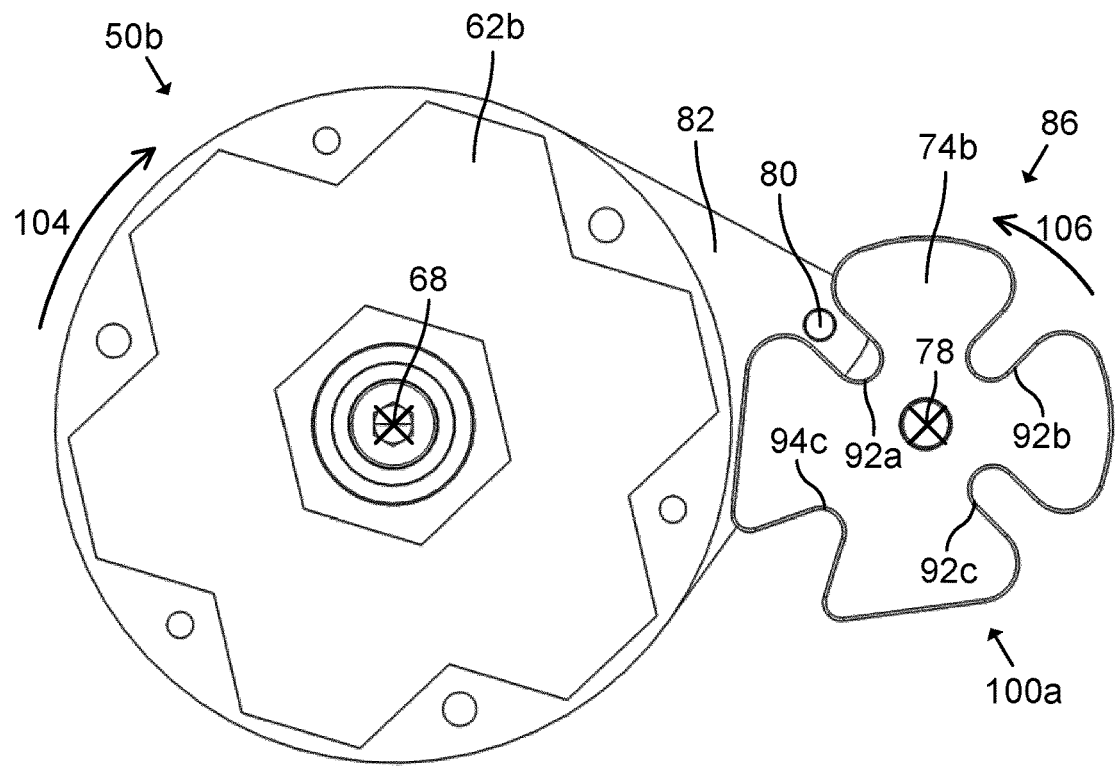
FIG. 11: schematically represents a top view of the arrangement in FIG. 10 when the drive member has rotated from the first end position.

FIG. 11 schematically represents a top view of the arrangement 50b when the drive member 62b has rotated from the first end position 98a (clockwise in FIG. 11) as illustrated with arrow 104. When the drive member 62b has rotated almost a full turn about the drive axis 68, the drive pin 80 engages the first driven feature 92a. The rotation of the drive member 62b and the engagement between the drive pin 80 and the first driven feature 92a overcomes the magnetic holding force of the holding mechanism 86 and causes the stopping member 74b to rotate (counterclockwise in FIG. 11) as illustrated with arrow 106.

Figure 12:
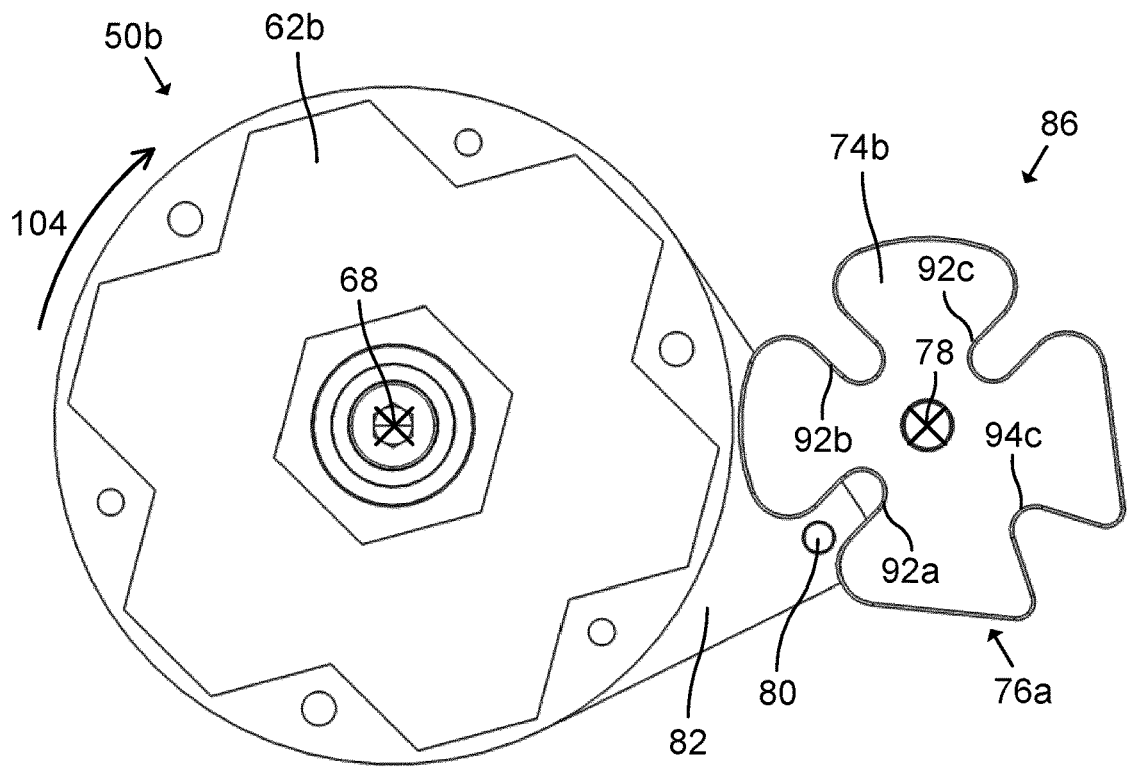
FIG. 12: schematically represents a top view of the arrangement in FIGS. 10 and 11 when the drive member has rotated further and the stopping member has moved to a first intermediate discrete position.

FIG. 12 schematically represents a top view of the arrangement 50b when the drive member 62b has rotated further and the stopping member 74b has been rotated to a first intermediate discrete position 76a.

Figure 13:
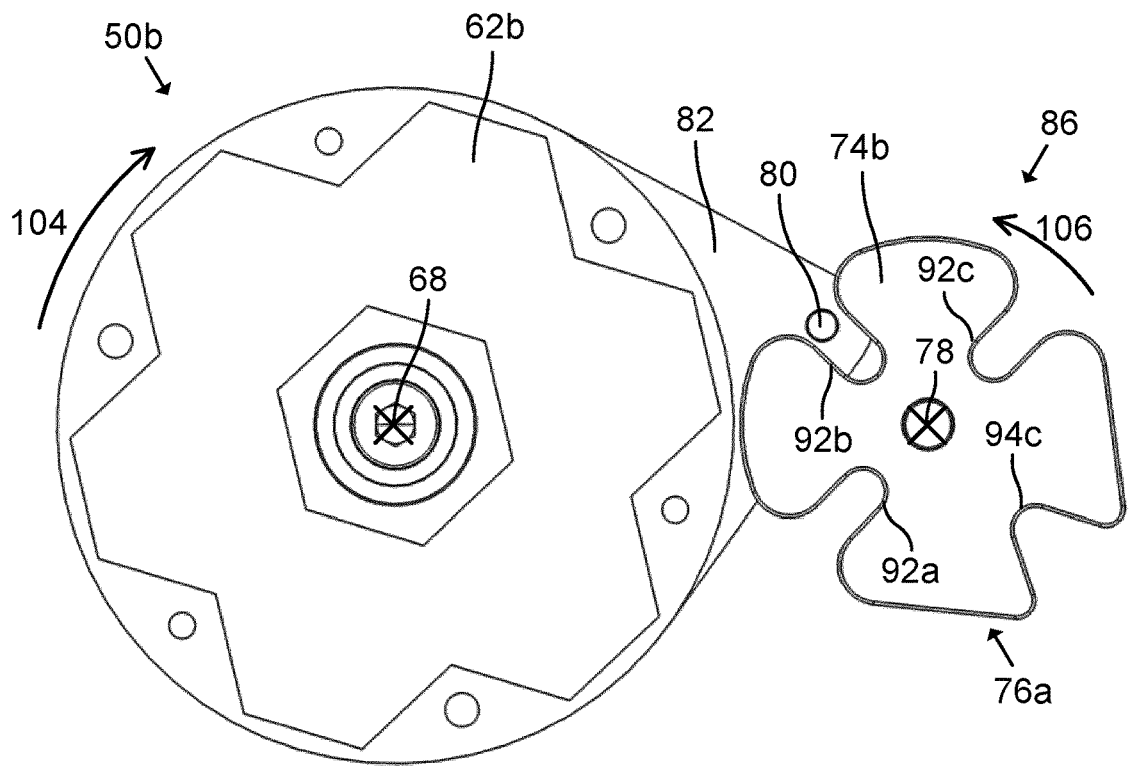
FIG. 13: schematically represents a top view of the arrangement in FIGS. 10 to 12 when the drive member has rotated further.

FIG. 13 schematically represents a top view of the arrangement 50b when the drive member 62b has rotated further. In FIG. 13, the drive pin 80 now engages the second driven feature 92b. The rotation of the drive member 62b and the engagement between the drive pin 80 and the second driven feature 92b overcomes the magnetic holding force of the holding mechanism 86, and causes the stopping member 74b to again rotate (counterclockwise in FIG. 13) as illustrated with arrow 106.

Figure 14:
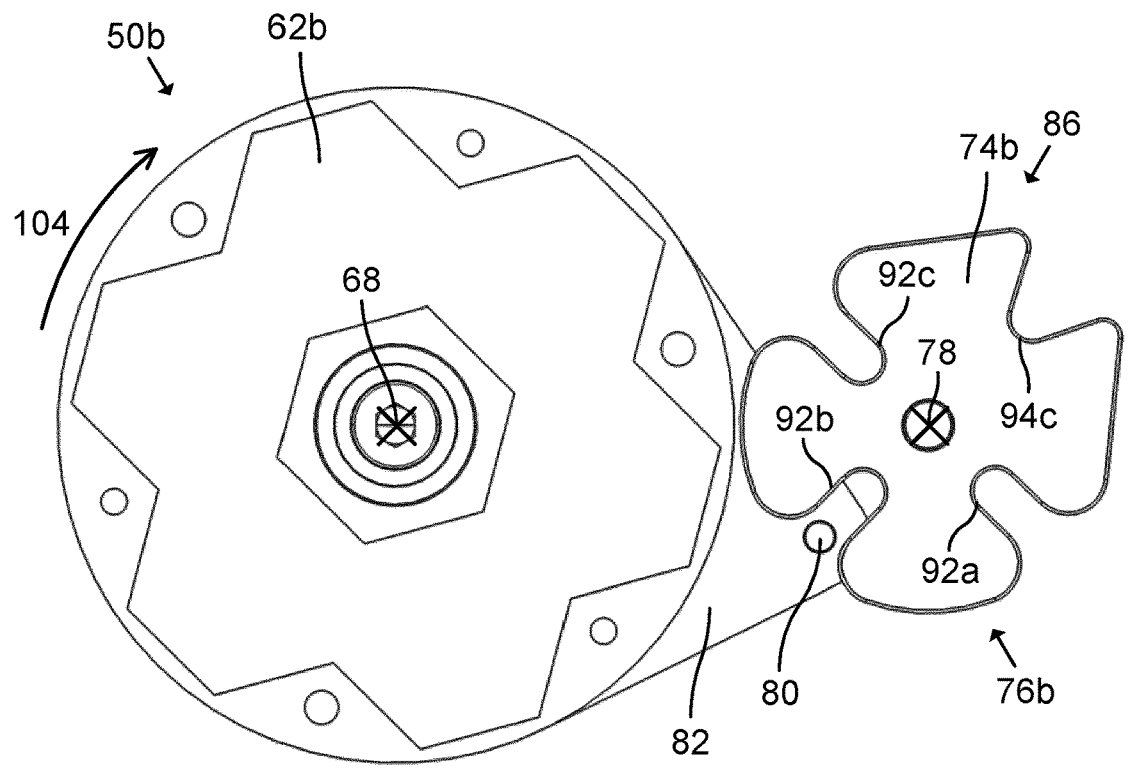
FIG. 14: schematically represents a top view of the arrangement in FIGS. 10 and 13 when the drive member has rotated further and the stopping member has moved to a second intermediate discrete position.

FIG. 14 schematically represents a top view of the arrangement 50b when the drive member 62b has rotated further and the stopping member 74b has rotated to a second intermediate discrete position 76b.

Figure 15:
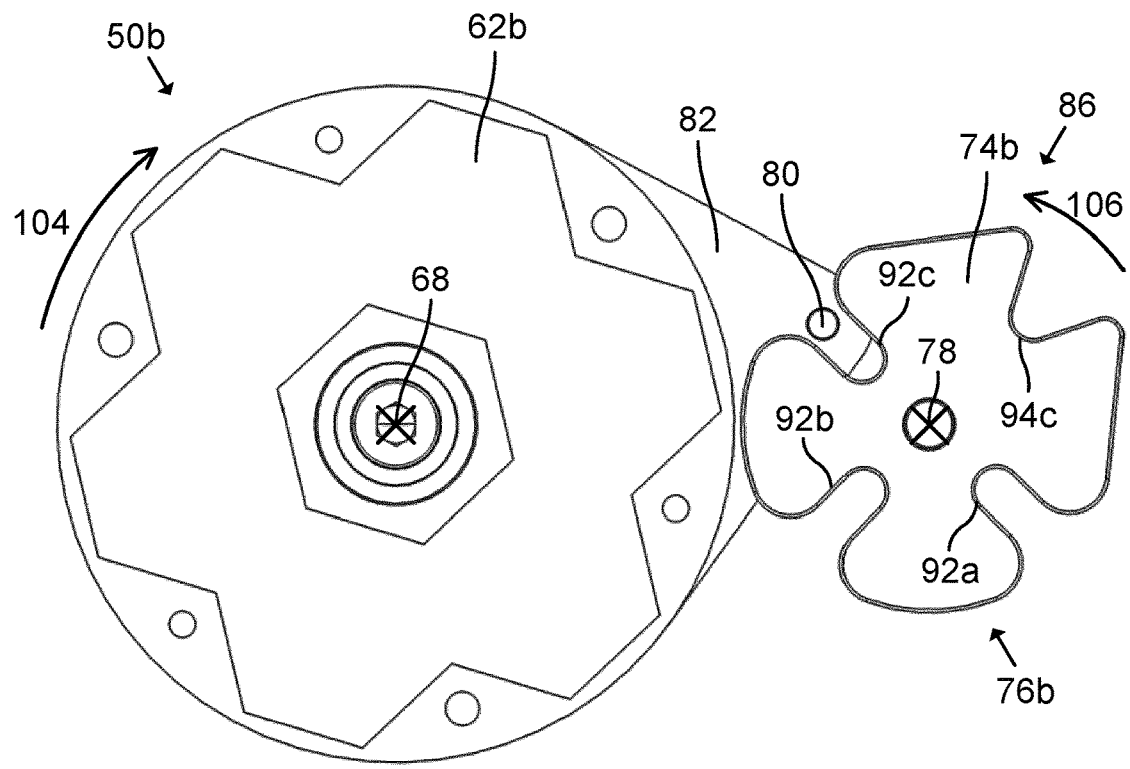
FIG. 15: schematically represents a top view of the arrangement in FIGS. 10 to 14 when the drive member has rotated further.

FIG. 15 schematically represents a top view of the arrangement 50b when the drive member 62b has rotated further. In FIG. 15, the drive pin 80 now engages the third driven feature 92c. The rotation of the drive member 62b and the engagement between the drive pin 80 and the third driven feature 92c overcomes the magnetic holding force of the holding mechanism 86, and causes the stopping member 74b to again rotate (counterclockwise in FIG. 15) as illustrated with arrow 106.

Figure 16:
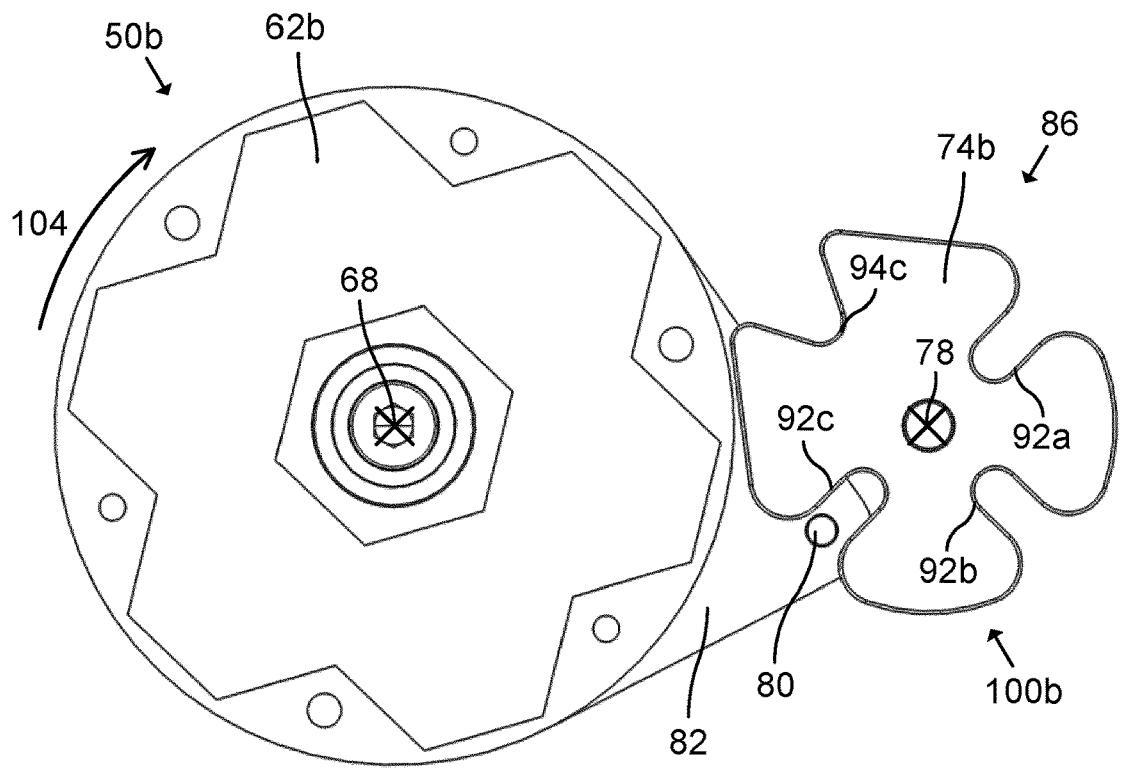
FIG. 16: schematically represents a top view of the arrangement in FIGS. 10 to 15 when the drive member has rotated further and the stopping member has moved to a second end discrete position.

FIG. 16 schematically represents a top view of the arrangement 50b when the drive member 62b has rotated further and the stopping member 74b has rotated to a second end discrete position 100b. The holding mechanism 86 holds the stopping member 74b in the second end discrete position 100b.

Figure 17:
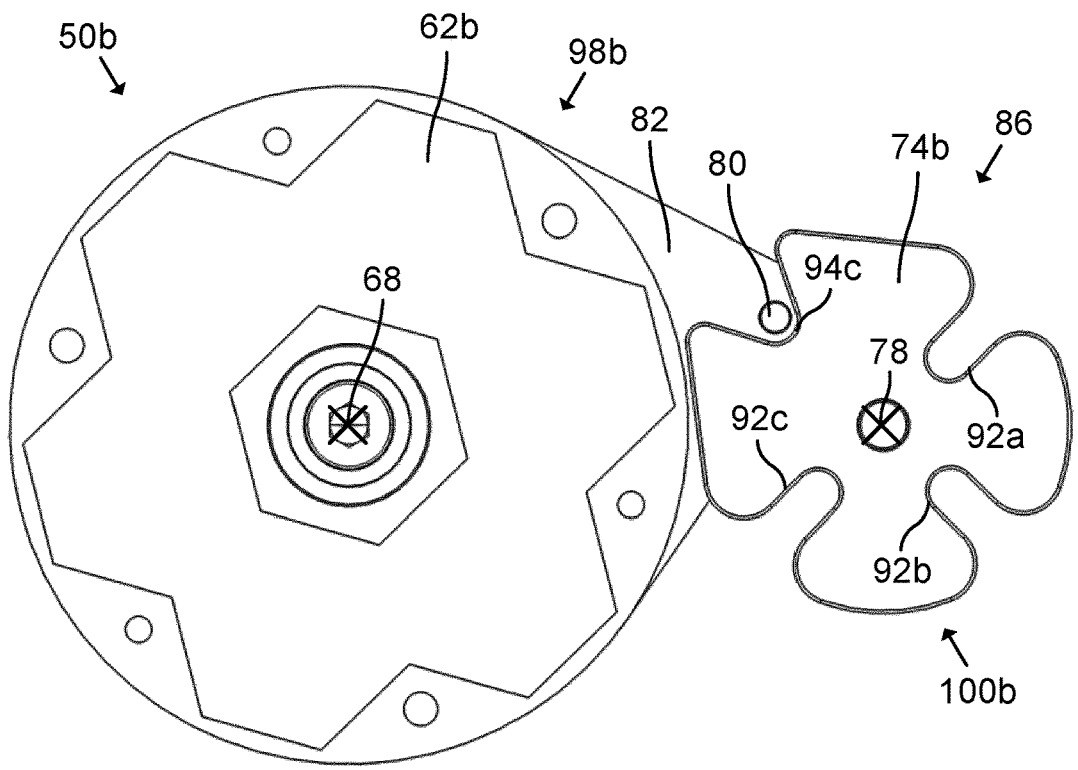
FIG. 17: schematically represents a top view of the arrangement in FIGS. 10 to 16 when the drive member has rotated further to a second end position.
Figure 18:
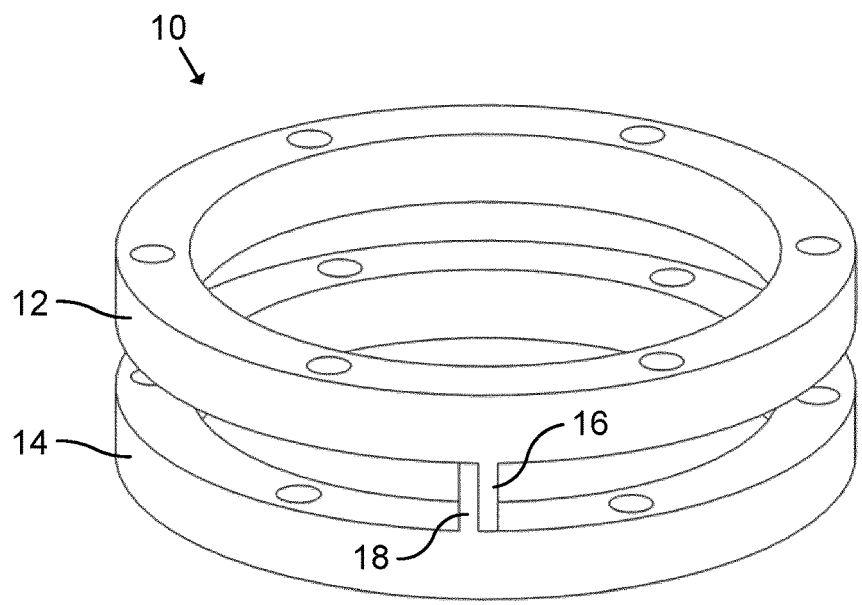
FIG. 18: schematically represents a top view of a joint having limited rotation according to the prior art.
Figure 19:
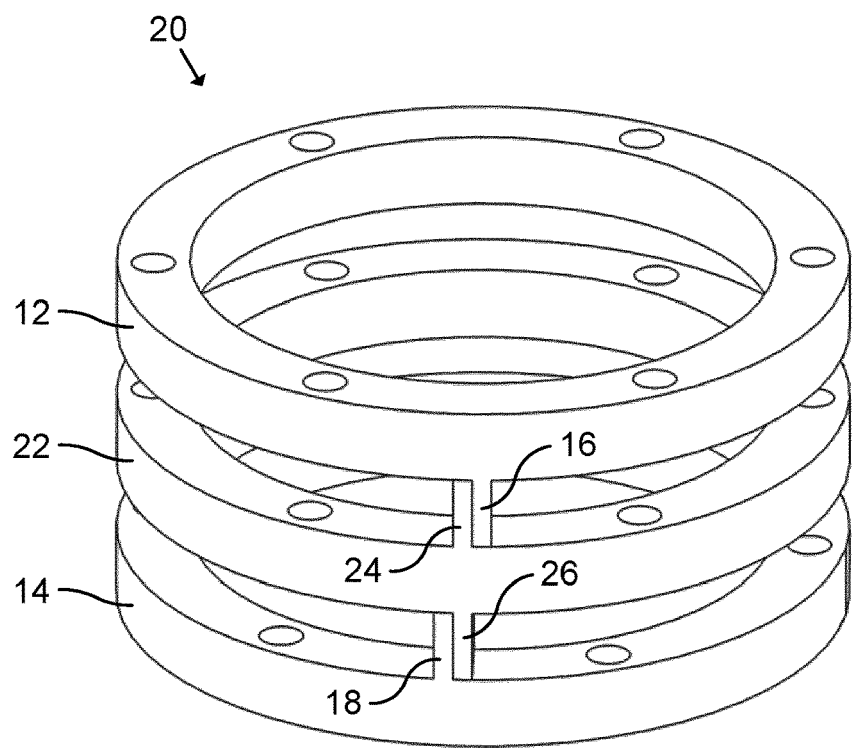
FIG. 19: schematically represents a top view of a further example of a joint having limited rotation according to the prior art.
Figure 20:
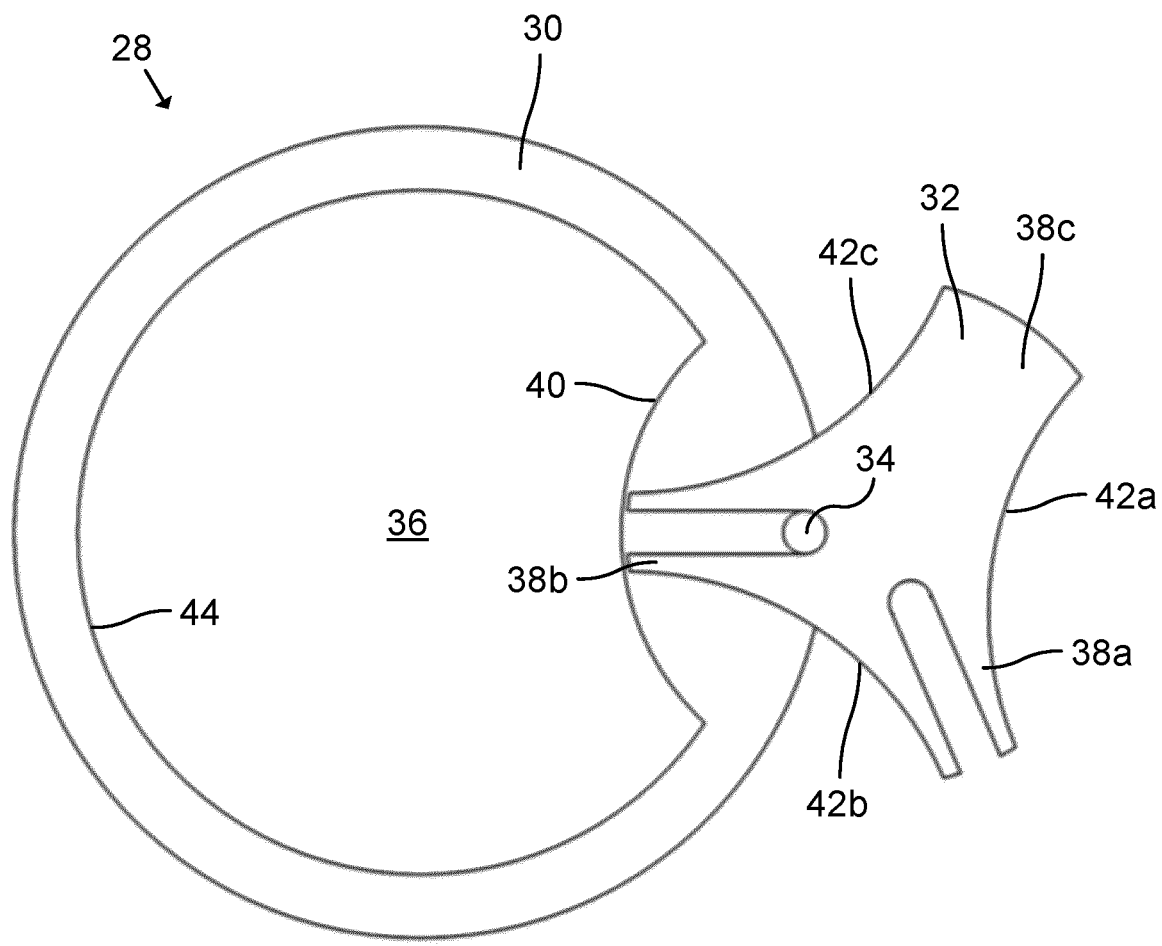
FIG. 20: schematically represents a top view of a Geneva stopwork according to the prior art.

FIG. 17 schematically represents a top view of the arrangement 50b when the drive member 62b has rotated further to a second end position 98b of the rotation range. The rotation range of the specific arrangement 50b is approximately 1410 degrees. When the stopping member 74b is in the second end discrete position 100b and the drive member 62b is in the second end position 98b, the drive pin 80 is again seated in the stopping feature 94c.

Although the arrangements 50a and 50b have been described in connection with a wheel unit 48a, the arrangements 50a and 50b may very well be used in other implementations where it is desired to limit rotation.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An arrangement for limiting rotation, comprising:
   a base structure;
   a drive member rotatable relative to the base structure about a drive axis, the drive member having a drive feature offset from the drive axis;
   a stopping member having at least one driven feature, wherein the stopping member is arranged to be intermittently driven relative to the base structure between a plurality of discrete positions by a continuous rotation of the drive member and by cooperation between the drive feature and the at least one driven feature, wherein the stopping member in a first end discrete position is arranged to limit rotation of the drive member in a first end position of a rotation range of the drive member, and in a second end discrete position is arranged to limit rotation of the drive member in a second end position of the rotation range; and
   a holding mechanism arranged to hold the stopping member in each discrete position, the holding mechanism being at least partly provided in the base structure.

2. The arrangement according to claim 1, wherein the holding mechanism includes at least one magnet arranged to hold the stopping member in each discrete position by magnetic force.

3. The arrangement according to claim 2, wherein the stopping member is rotatable about a stopping axis.

4. The arrangement according to claim 2, wherein the drive feature is positioned on a drive member surface of the drive member, and wherein a distance from the drive axis to the drive feature is at least 80% of a distance from the drive axis to a radially outermost position of the drive member surface with respect to the drive axis.

5. The arrangement according to claim 2, wherein the drive feature includes a drive pin.

6. The arrangement according to claim 2, wherein the stopping member is made of plastic.

7. The arrangement according to claim 2, further comprising a cable fixed with respect to each of the base structure and the drive member.

8. The arrangement according to claim 2, further comprising a drive motor arranged to drive the drive member about the drive axis, wherein the drive motor is positioned radially inside the drive feature with respect to the drive axis.

9. The arrangement according to claim 1, wherein the stopping member is rotatable about a stopping axis.

10. The arrangement according to claim 9, further comprising a plain bearing, wherein the stopping member is rotatably supported about the stopping axis by the plain bearing.

11. The arrangement according to claim 10, wherein the stopping member includes a stopping feature, wherein the stopping feature and the stopping axis are substantially positioned on a line deviating at most 30°, such as at most 20° or at most 10°, from a tangential line at the drive feature with respect to the drive axis when the stopping member is in the first end discrete position and the drive member is in the first end position.

12. The arrangement according to claim 9, wherein the stopping member includes a stopping feature, wherein the stopping feature and the stopping axis are substantially positioned on a line deviating at most 30°, such as at most 20° or at most 10°, from a tangential line at the drive feature with respect to the drive axis when the stopping member is in the first end discrete position and the drive member is in the first end position.

13. The arrangement according to claim 1, wherein the drive feature is positioned on a drive member surface of the drive member, and wherein a distance from the drive axis to the drive feature is at least 80% of a distance from the drive axis to a radially outermost position of the drive member surface with respect to the drive axis.

14. The arrangement according to claim 1, wherein the drive feature includes a drive pin.

15. The arrangement according to claim 1, wherein the stopping member is made of plastic.

16. The arrangement according to claim 1, further comprising a cable fixed with respect to each of the base structure and the drive member.

17. The arrangement according to claim 16, further comprising a driven motor fixed with respect to the drive member, wherein the cable is fixedly connected to the driven motor.

18. The arrangement according to claim 1, further comprising a drive motor arranged to drive the drive member about the drive axis, wherein the drive motor is positioned radially inside the drive feature with respect to the drive axis.

19. A robot comprising an arrangement for limiting rotation, including:
a base structure;
a drive member rotatable relative to the base structure about a drive axis, the drive member having a drive feature offset from the drive axis;
a stopping member having at least one driven feature, wherein the stopping member is arranged to be intermittently driven relative to the base structure between a plurality of discrete positions by a continuous rotation of the drive member and by cooperation between the drive feature and the at least one driven feature, wherein the stopping member in a first end discrete position is arranged to limit rotation of the drive member in a first end position of a rotation range of the drive member, and in a second end discrete position is arranged to limit rotation of the drive member in a second end position of the rotation range; and
a holding mechanism arranged to hold the stopping member in each discrete position, the holding mechanism being at least partly provided in the base structure.

20. The robot according to claim 19, wherein the robot is an automated guided vehicle, AGV, having at least one wheel unit including a traction wheel rotatable about the drive axis and about a wheel axis perpendicular to the drive axis.

* * * * *